May 11, 1965

R. P. MONTESI 3,182,952

BALL VALVES

Filed Oct. 30, 1961

INVENTOR.
Robert P. Montesi
BY
Mason, Kolehmainen, Rathburn & Wyss
Attorneys

United States Patent Office 3,182,952
Patented May 11, 1965

3,182,952
BALL VALVES
Robert P. Montesi, Chicago, Ill., assignor to Clayton Mark & Company, Evanston, Ill., a corporation of Delaware
Filed Oct. 30, 1961, Ser. No. 148,644
3 Claims. (Cl. 251—148)

The present invention relates to ball valves and has for its primary object the provision of a new and improved valve of this type.

A further object of the present invention is to provide a ball valve with a new and improved union end assembly facilitating assembly and disassembly relative to a pipe line and adjustment of the valve body into desired position while under pressure.

A further object of the present invention is to provide a ball valve having union end assemblies enabling the valve body to be removed without disassembly of the union assembly from the pipe line.

A further object of the present invention is the provision of a ball valve having a removable spacer at one end constructed with sealing means sealing the spacer relative to a surrounding valve body and abutting union end.

In brief, the ball valve of the present invention includes a body including externally threaded end portions having planar radially extending end surfaces and a chamber in which is rotatably mounted a ball valve element. An integral end of the body is provided with a passageway defining opening having a diameter corresponding to that of a passageway through the ball. The opposite end of the body is provided with an opening large enough to enable the ball to be moved axially therein. This end is closed by a spacer received in the valve body and having a circumferential and radial surface, at the junction of which is provided an annular gasket receiving groove. This end is closed by a union end, the arrangement being such that the gasket is compressed between the union end, the body and the spacer. A union end is provided also at the integral end of the valve body and both the union ends are detachably secured to the valve body by union nuts. The arrangement is such that the body can be removed from a pipe line without disassembly of the union ends from the pipe line and the body can also be rotated into desired position. Furthermore, the union end at the integral end of the valve body can be removed with the ball in closed position against pressure directed thereon at the other end.

Other objects and advantages of the present invention will become apparent from the ensuing description of an illustrative embodiment thereof, in connection with which reference is had to the accompanying drawing, in which.

Figure 1:
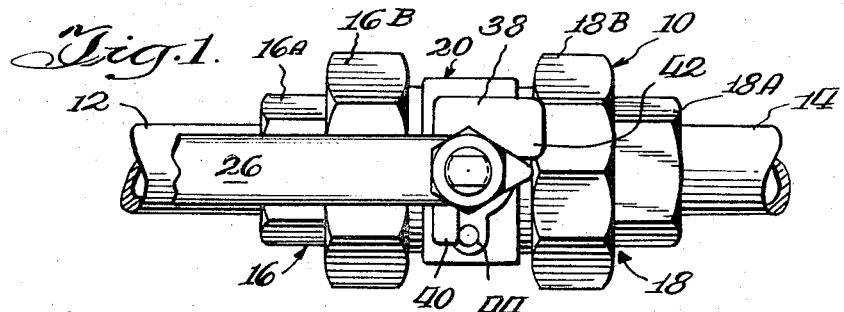
FIG. 1 is a top plan view of the valve of the present invention shown installed in a pipe line.

Referring to the drawing, the valve as a whole is indicated by the reference character 10. It is shown installed in a pipe line including a pipe 12 and a pipe 14 of which the latter will be considered an inlet pipe and the former an outlet. Thus considered, the left end of the valve is the downstream and the right end is the upstream one.

The valve has union end assembles 16 and 18 comprising the union ends 16A and 18A and the union nuts 16B and 18B and an intermediate valve body indicated as a whole by the reference character 20 within which is located a chamber 22 rotatably receiving a movable valve element or ball 24 adapted to be turned by means of a handle 26 and valve stem 28. Within the chamber 22 are the opposed resilient seals 30 and 32, which may be constructed and arranged as disclosed and claimed in my contemporaneously filed application Serial No. 148,645.

The stem includes an upper polygonal portion 34 to which the handle 26 is secured as by a lock nut 36. Also secured to the stem may be a position determining stop plate 38 having extensions 40 and 42 engageable with a stop pin 44 mounted on the body. The arrangement is such that the ball 24 is movable 90° between the open position shown in FIG. 2 and the closed position of FIG. 3. The valve stem is held in position by a nut 46 having external threads received in an internally threaded portion of an outwardly extending boss 48. The lower end of the nut bears against the end of a thrust washer 50, in turn bearing against a dual diameter flanged portion 52 of the valve stem. Below the portion 52 is a stem seal 54 bearing against another and somewhat smaller portion 56 on the stem.

The driving connection between the stem and ball is supplied by a tongue like portion 58 at the end of the stem received somewhat loosely in a groove 60 in the ball, the groove extending at right angles to the flow passage 62 in the ball 24.

In the open position of the valve, the ball flow passage 62 is aligned with a flow passage 64 in an integral end portion 66 of the valve body 20, the diameter of the flow passages 62 and 64 being substantially equal. The end portion 66 is provided with a planar end surface 68 abutted against a planar end surface 70 of the union end 16A. The end portion 66 is also provided with external threads 72 for cooperation with the internal threads on the union nut 16B. The latter has an inwardly extending flange 74 cooperating with an annular external flange 76 on the union end 16A whereby the parts are held detachably in assembled relation. A gasket 78 is placed in a groove 80 in the planar end 68 of the integral body portion 66 to seal the junction between the body and union end. The union end, it should be noted, is provided with an internal flow passage 82 somewhat larger in diameter than the flow passage 64 in the valve body and is internally threaded for reception of pipe 12.

The upstream end of the valve body has an axial opening 84 of a diameter somewhat greater than that of the ball in order that the ball may be placed in the body through it when the union end 18 is disassembled. The upstream end of the valve is provided with a spacer 86 closely seating at its outer peripheral surface 88 in the body opening 84. The spacer has an internal passageway 90 corresponding in diameter to the flow passage 62 in the ball and a planar end surface 92 abutted against the planar end surface 94 of the union end 18A. The latter has an external peripheral flange 96 engaged by the inwardly extending flange 98 of the union nut 18B when the latter has its internal threaded portion threaded onto the external threaded portion 100 of the body.

Figure 2:
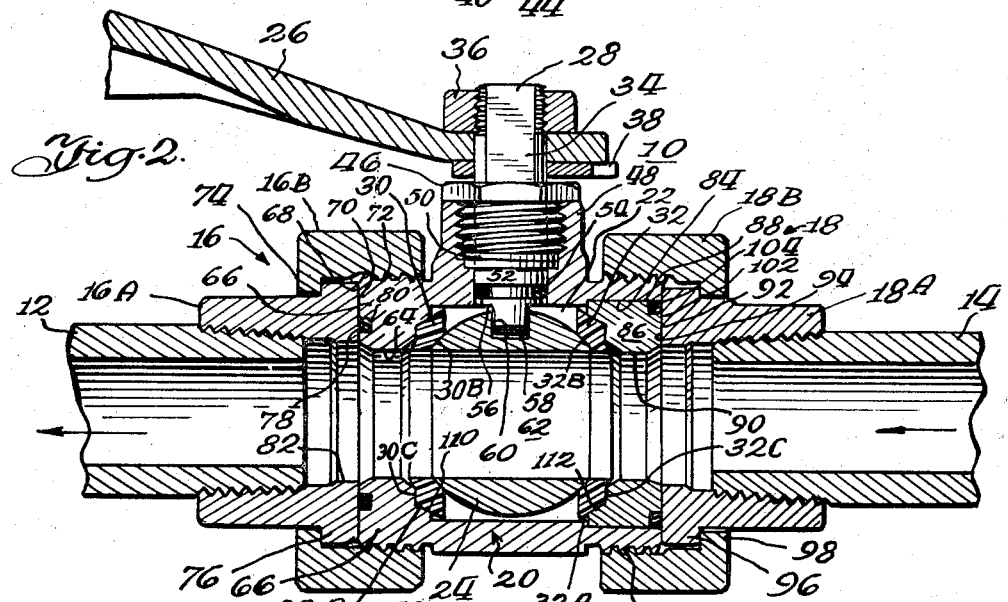
FIG. 2 is a longitudinal axial view through the valve with the valve in open position.

The junction of the peripheral surface 84 and planar surface 92 of spacer 86 is provided with a groove 102 within which is disposed a gasket 104 having a diameter somewhat greater than the dimensions of the groove whereby, when assembled as shown in FIG. 2, the gasket is radially compressed between the spacer and the peripheral surface 84 of the body, and axially between the radial planar surface of the groove 102 of the surface 94 of the union end and planar surface 92 of the spacer, whereby leakage in a plurality of directions is prevented by the seal. The manufacturing tolerances are such that the union end always abuts against the spacer and gasket. It should not abut substantially against the body.

Figure 3:
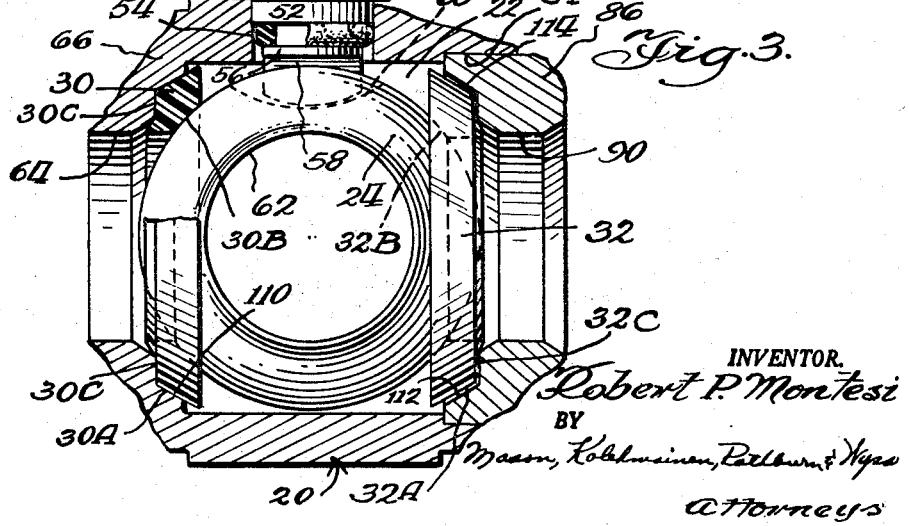
FIG. 3 is an enlarged fragmentary view similar to FIG. 2 with the valve in closed position.

As disclosed in my copending application, the seals 30 and 32 are constructed with peripheral tapered surfaces 30A and 32A adjacent to complementary tapered surfaces 110 and 112 on the integral body portion 66 and spacer 86, respectively. The seals also have ball engaging surfaces 30B and 32B and planar body engaging surfaces 30C and 32C, respectively, which engage planar portions of the integral body portion 66 and spacer 86, respectively. With the valve in open position, the ball is held effectively centered and sealed by the seals 30 and 32, as illustrated in FIG. 2. Under pressure, the ball is moved from the upstream to the downstream side, as illustrated in FIG. 3. When this occurs, the seal 30 is compressed somewhat and the seal 32 is moved downstream with the ball thereby to open an annular passageway 114 around what might be considered the outside of the seal. The result is equalization of pressure around the seal whereby closing of the valve is facilitated. The flow through the valve can be in the opposite direction, in which event seal 32 would be compressed and seal 30 would move downstream with the ball.

In installing the valve, the pipes 12 and 14 may be cut and externally threaded either before or after they have been installed. Thereafter, the union nuts are placed on the ends 16A and 18A and the latter are threaded onto the pipes 12 and 14. The seal 30, the ball valve 24, seal 32 and spacer 86 are assembled in that order in the valve body, to which the stem assembly has previously been secured. Thereafter, the body is inserted between the union ends 16A and 18A, after which the nuts 16B and 18B are tightened. Once this is done the valve is ready for operation. In the open position, flow takes place from the right to the left, in accordance with the assumption heretofore made.

Should it be desirable either during or after installation to rotate the valve body, this can be done, even under pressure conditions, simply by loosening the nuts 16B and 18B. When this is done the body and nuts can be turned relative to the union ends. Also, should it be desirable to disconnect the downstream end of the valve, this can be done by loosening the nut 16B. At this time, the integral body end portion 66 is effective to hold the ball in its closed position. Furthermore, upon loosening of the union nuts, the body can be removed from the pipe line, whereby the seals and ball can be removed. The gasket 104 is effective, as described in detail above to prevent leakage either from the pipe line or valve chamber by virtue of its location between the spacer valve body and union end 18A.

While the present invention has been illustrated and described in connection with the details of a particular embodiment, it should be understood that such details are not intended to be limitative of the invention except insofar as set forth in the accompanying claims.

What is claimed as new and desired to be secured by Letters Patent of the United States is:

1. A ball valve having a body with a chamber, a ball valve element rotatably mounted in said chamber, means sealing one end of said valve element, means sealing the other end of said element including a resilient seal engaging the ball and a removable spacer engaging the seal, said spacer having a peripheral circumferential surface received in the body and a radial planar end surface, said spacer having an annular groove at the junction of said circumferential and radial planar surfaces, a sealing gasket in said groove having radial and axial dimensions greater than those of said groove, and means holding said spacer in said body and compressing said gasket axially between said spacer and holding means and radially between said spacer and body.

2. A ball valve including an integral body having a chamber, a rotatable ball valve element mounted in said chamber and having a passageway therethrough, said body having at one end an integral portion with a first passageway therethrough corresponding in size to the passageway through said element, a resilient gasket between said portion and element having a passageway therethrough corresponding in size to those in the body and element, a second similar seal at the opposite side of the valve element, a second end of said body having a second passageway such that the valve element may be inserted into the chamber therethrough, a spacer abutting against the second seal having an external cylindrical portion closely received in the second passageway in the valve body and abutted against a shoulder in the body, said integral end of the valve body and spacer having planar outer end portions, union ends having planar ends abutted against said planar outer end portions, sealing gaskets between said union ends and planar end portions, the gasket between the spacer and the adjacent union end being disposed in an annular groove at the meeting surfaces of the planar end and peripheral portions of the spacer, and union nuts threadedly mounted on said valve body for holding said union ends in coupled relation to the valve body and compressing the sealing gaskets between the union ends and planar end portions of the valve body and spacer, respectively, and the spacer sealing gasket also against the valve body.

3. A ball valve including a body with a chamber, a rotatable ball valve in said chamber, said body having externally threaded end portions with radially extending planar end surfaces, one of the planar end surfaces on the body comprising an integral portion of the body and the other comprising an annular surface of an axially movable spacer having an axially extending peripheral portion encircled by a portion of the body, union ends having radially extending planar end surfaces abutted against the planar end surfaces of the body and spacer, respectively, sealing means interposed between the abutting end surfaces of said union ends and body and spacer, said spacer having and annular groove at the junction of its planar and peripheral portions, and said sealing means comprising a gasket located in said groove and having radial and axial dimenisons greater than those of the groove so as to be compressed both radially and lengthwise of the body by the associated union end, and union nuts threaded onto the external threads of the body for detachably securing said union ends to the body.

References Cited by the Examiner

UNITED STATES PATENTS

| | | | |
|---|---|---|---|
| 1,327,984 | 1/20 | Campbell | 251—315 |
| 2,839,266 | 6/58 | Kaiser | 251—315 X |
| 2,868,497 | 1/59 | Graham | 251—317 X |
| 2,905,197 | 9/59 | Janes | 251—317 X |
| 2,995,336 | 8/61 | Usab | 251—315 X |
| 3,039,484 | 6/62 | Bredtschneider | 137—454.2 |

FOREIGN PATENTS

| | | |
|---|---|---|
| 682,227 | 10/39 | Germany. |

M. CARY NELSON, *Primary Examiner.*